Jan. 25, 1966 L. A. MYERS ETAL 3,230,933
POULTRY FEEDER APPARATUS
Filed Oct. 4, 1963 4 Sheets-Sheet 1
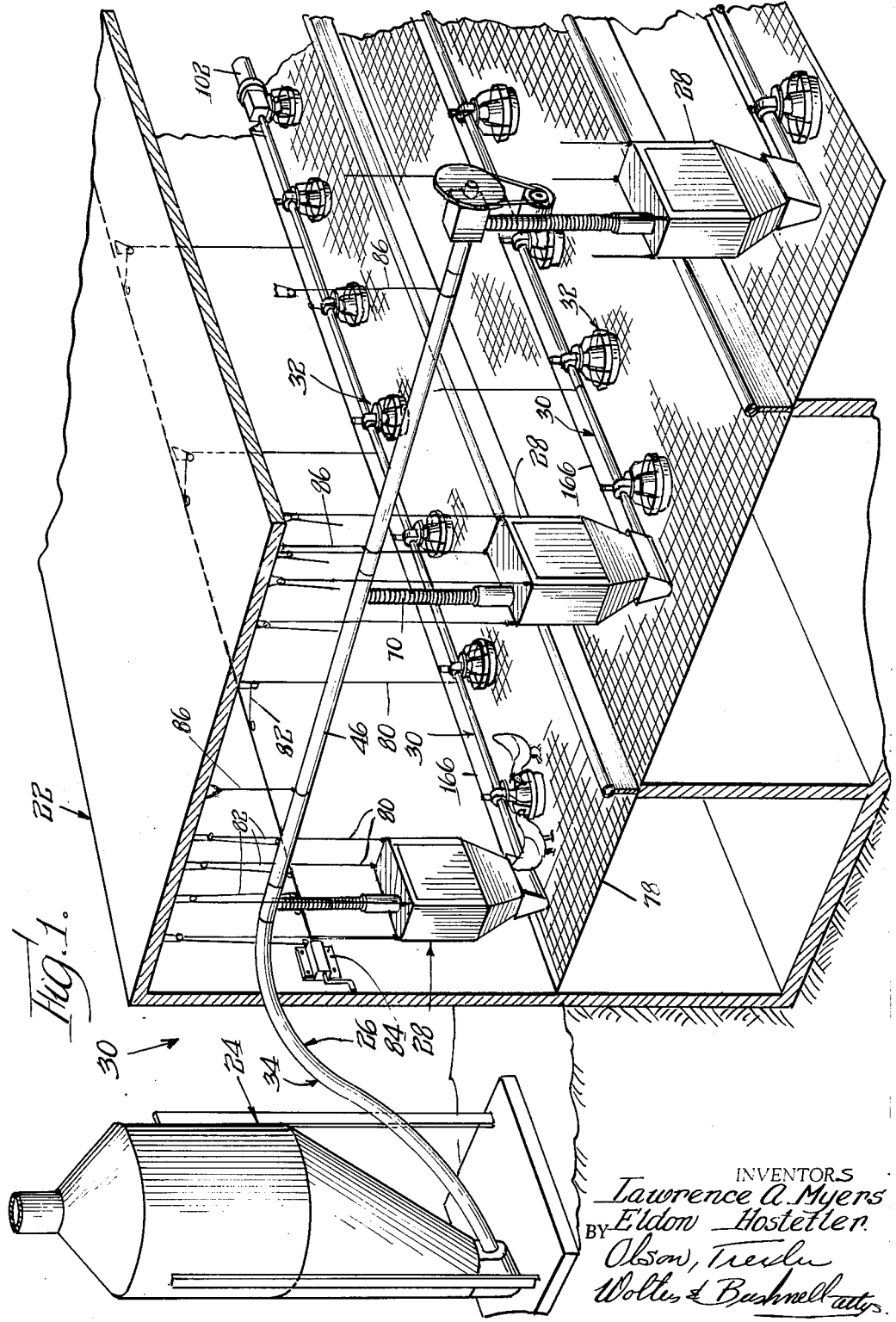
INVENTORS
Lawrence A. Myers
BY Eldon Hostetler
Olson, Trexler
Wolters & Bushnell attys.

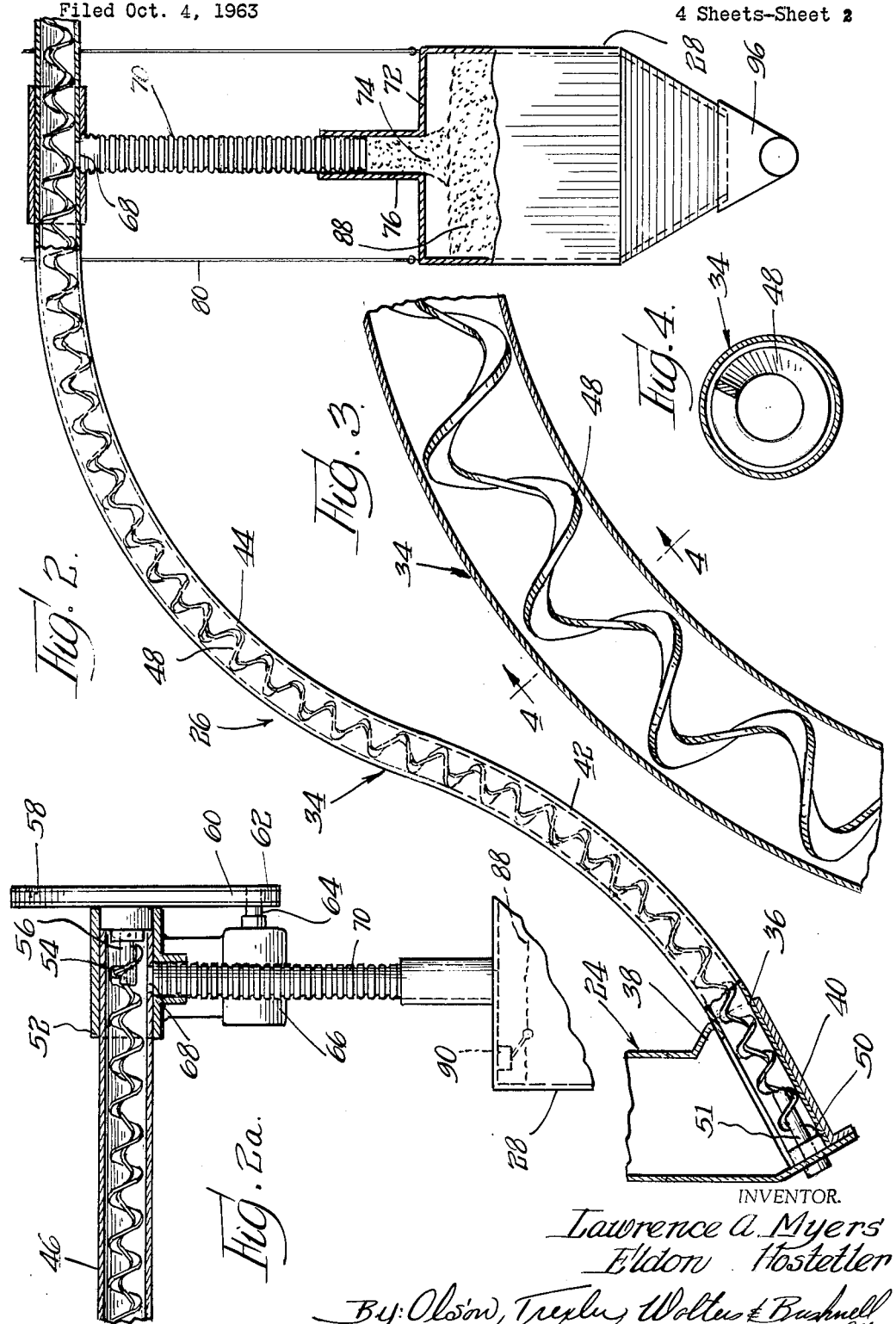

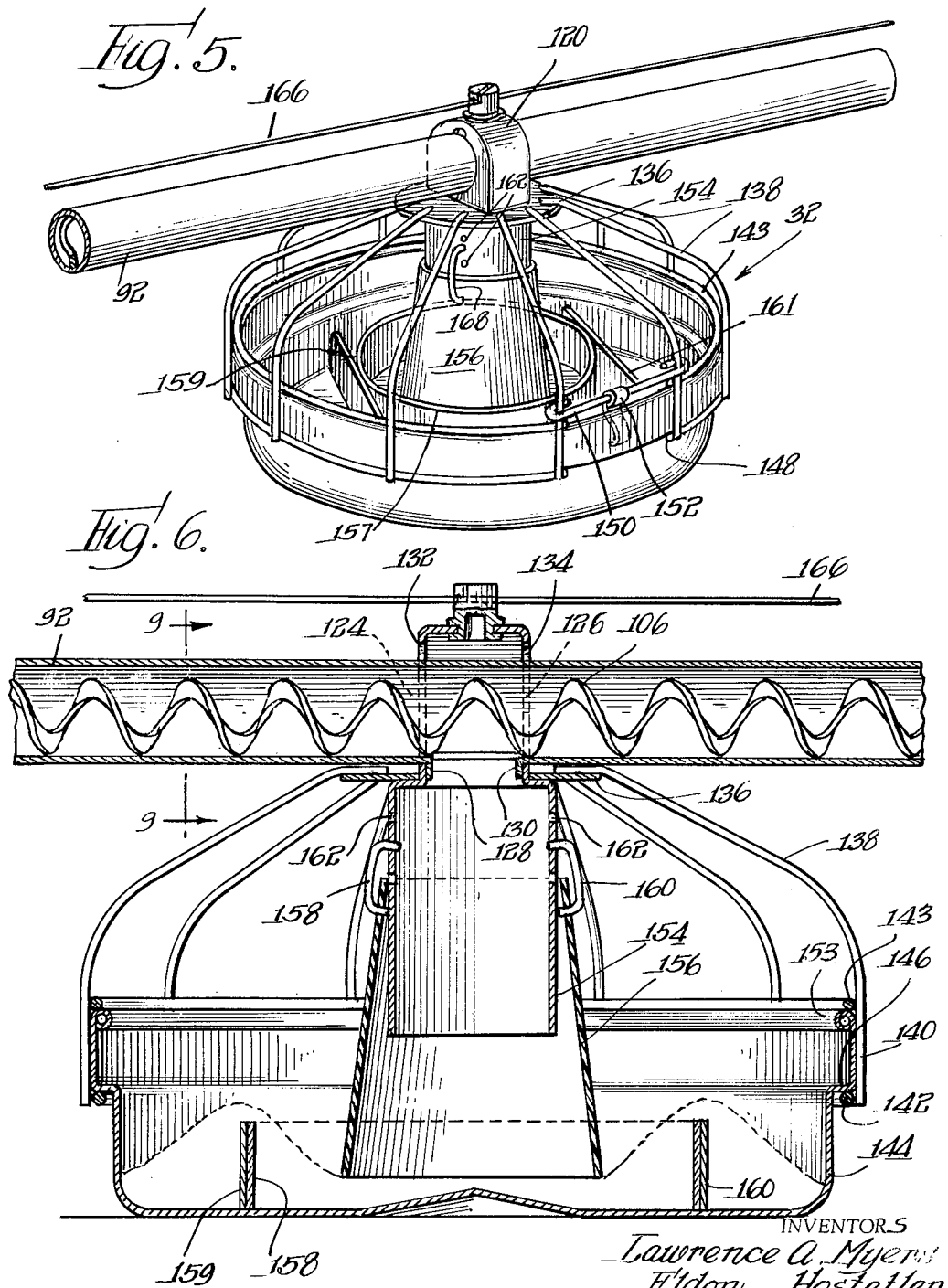

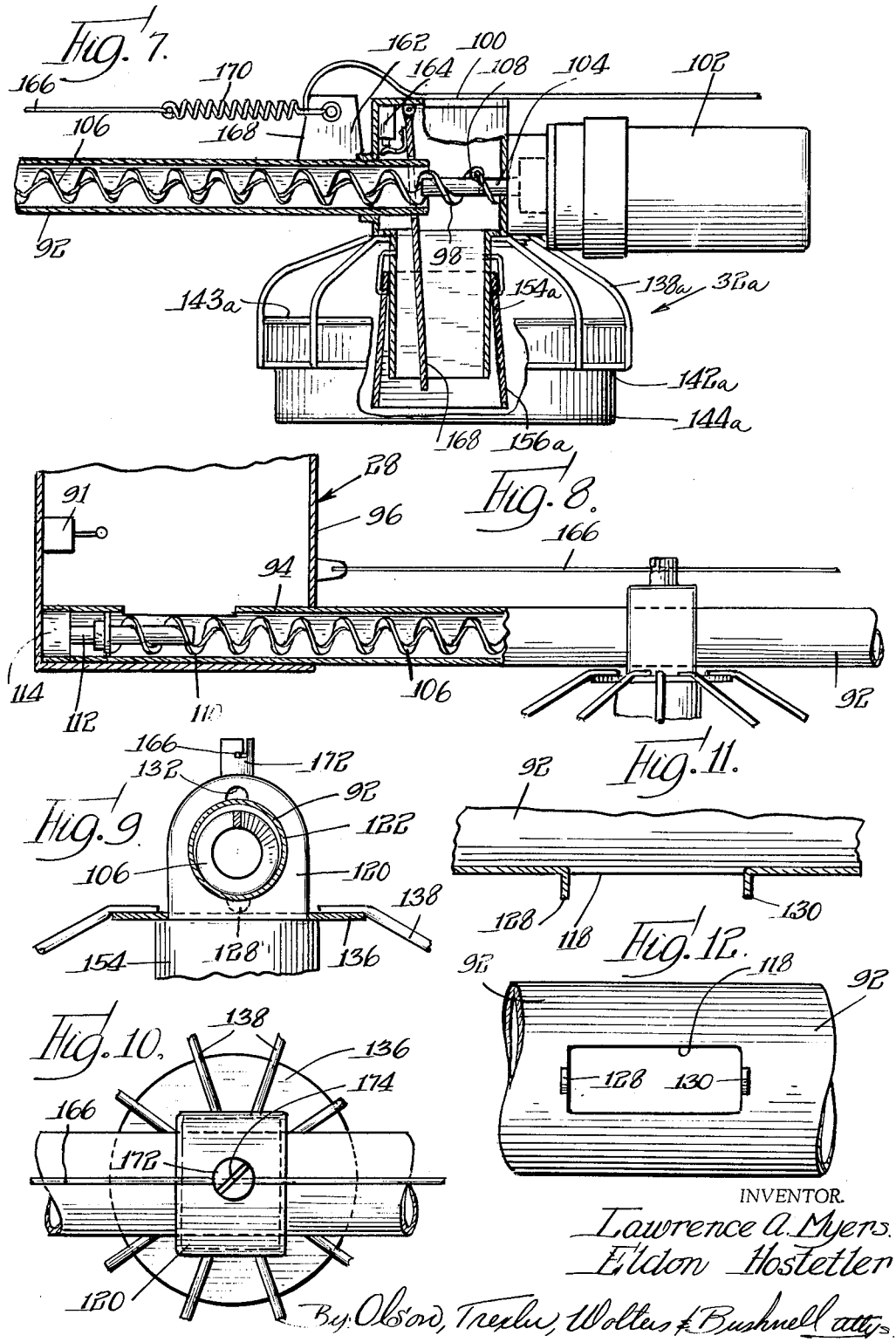

United States Patent Office 3,230,933
Patented Jan. 25, 1966

3,230,933
POULTRY FEEDER APPARATUS
Lawrence A. Myers, Milford, and Eldon Hostetler, Middlebury, Ind., assignors to Chore-Time Equipment, Inc., Milford, Ind., a corporation of Indiana
Filed Oct. 4, 1963, Ser. No. 314,066
13 Claims. (Cl. 119—53)

The present invention relates to a novel feeder apparatus and more specifically to a novel aparatus adapted automatically to apply feed for poultry and the like.

Apparatuses of the general type contemplated herein have been suggested which include means for conveying feed from a source of supply to a plurality of feeding stations within a poultry house or other desired location. While certain of said heretofore suggested structures have been operated successfully problems have been encountered in providing installations economically, in reliability and in supplying the feed to the poultry in a manner which insures proper feeding of all birds.

It is an important object of the present invention to provide a novel feeding apparatus capable of delivering feed automatically and with improved reliability to a plurality of feeding stations in a manner which assures proper feeding of substantially all of the birds or other animals to be fed.

Another important object of the present invention is to provide a novel feeding apparatus which may be supplied to a customer in a knocked-down condition and which may be easily and relatively quickly installed.

A further object of the present invention is to provide a novel feeding apparatus which is adapted to be suspended above the floor of a poultry house and which may be raised for facilitating the cleaning of the house without requiring emptying of feed from any portions of the apparatus.

Still another object of the present invention is to provide a novel feeding apparatus having feed conveying means including a tube and helical auger means within the tube constructed and arranged for minimizing frictional contact between the auger means and the tube for reducing wear of the parts and grinding of feed material being conveyed and for promoting more efficient operation.

Still another important object of the present invention is to provide a novel feeder structure of the above-described type having means for conveying feed to a plurality of feeder stations or pan assemblies in a manner which will preclude the establishment of a feed delivery pattern or sequence to the pan assemblies that will cause the animals to be fed to crowd around only a limited number of such assemblies at one end of or other location in the conveying system.

A still further specific object of the present invention is to provide a feeding system of the type described in the preceding paragraph in which feed will be delivered at least part of the time simultaneously to all of the feeding stations.

A still further object of the present invention is to provide a novel apparatus having means for conveying feed to a plurality of pan assemblies and being supported for vertical adjustment above the floor of a poultry house, which pan assemblies are constructed for adjusting the level at which feed may flow therefrom and so that such adjustment will not be disturbed in the event the assembly is lowered sufficiently to permit the pan assemblies to engage the floor.

A still further specific object of the present invention is to provide a novel feeding apparatus of the above-described type having a feeding pan assembly constructed for providing an increased area for exposing feed to the birds or animals while at the same time preventing the birds from scratching an excess amount of feed from the pans.

Other objects and advantages of the present invention will become apparent from the following description and the accompanying drawings wherein;

FIG. 1 is a fragmentary perspective view showing a feeding system incorporating features of the present invention;

FIGS. 2 and 2a comprise an enlarged fragmentary partial sectional view of a portion of the system shown in FIG. 1;

FIG. 3 is a further enlarged partial sectional view of a portion of the feed conveying means shown in FIG. 2;

FIG. 4 is a cross-sectional view taken along line 4—4 in FIG. 3;

FIG. 5 is a fragmentary perspective view showing a portion of the feed conveying means and a feed pan assembly included in the apparatus of FIG. 1;

FIG. 6 is an enlarged sectional view of the portion of the apparatus shown in FIG. 5;

FIG. 7 is a partial sectional view showing a downstream terminal end portion of conveying means included in the apparatus of FIG. 1;

FIG. 8 is a partial sectional view showing an upstream terminal end portion of the conveying means of FIG. 7;

FIG. 9 is a fragmentary sectional view taken along line 9—9 in FIG. 6;

FIG. 10 is a fragmentary plan view of the portion of the apparatus shown in FIG. 9;

FIG. 11 is a fragmentary side elevational view showing a portion of a tube member of conveying means included in the apparatus of the present invention; and FIG. 12 is a bottom view of the portion of the tube shown in FIG. 11;

Referring now more specifically to the drawings wherein like parts are designated by the same numerals throughout the various figures, a feeding apparatus or system 20 incorporating features of the present invention is shown in FIG. 1. The system is adapted to be installed in association with a building 22 in which the poultry or other animals to be fed are to be housed. While the construction and arrangement of various portions of the apparatus may be modified in accordance with the particular requirement of a given installation, the system includes a bulk storage bin 24 which is usually located outside of the building 22. Conveying means 26 extends from the bin 24 for delivering feed to one or more supply hoppers 28 located within the building. Each of the supply hoppers 28 is associated with additional conveying means 30 adapted to direct food to a plurality of feeding stations spaced within the building 22 and more specifically to a plurality of feed pan assemblies 32.

As shown in FIGS. 1 through 4, the conveyor means 26 comprises an elongated tube 34 having one end 36 connected with a fitting 38 at the bottom of the storage bin 24. The fitting 38 has a bottom trough portion 40 having an upwardly inclined bottom which merges with the tube 34. The conveying means 26 is adapted to direct the feed from the bottom end of the storage bin 24 to elevated positions within the house or building 22 and thus the tube 34 is formed with an upwardly directed bend 42 extending from the lower end 36 of the tube and then a reverse bend 44 which merges with a generally horizontal tube portion 46. The tube portions 42 and 44 are arranged so as to combine in directing the feed generally upwardly at an angle inclined from both the horizontal and the vertical which facilitates efficient movement of the feed. The horizontal tube portion may be formed in one or more sections and traverses the building 22 so as to extend over all of the hoppers 28. In the embodiment shown in FIG. 1 the system is shown as including three hoppers 28 and related conveying mechanisms and feeding pan assemblies. However, it is to be understood that the system may be modified by increasing or reducing the number of hoppers 28 and related feeding mechanisms and by making appropriate modifications in the length of the conveying means 26.

The conveying means 26 further includes an elongated one-piece flexible and resilient helical screw member or auger 48. As shown best in FIGS. 3 and 4 the auger 48 is formed from a resilient wire having a generally rectangular configuration and is formed with a hollow core. Thus the screw member or auger 48 is relatively light in weight and is sufficiently flexible and resilient to enable it to extend around the bend portions 42 and 44 of the tube 34. Furthermore, the helix of the auger is preferably not in excess of about one-half the auger diameter and the radius of curvature of the bend portion is very large as compared with said diameter, for example, about fifty times the auger diameter whereby to obtain a significantly increased working life.

As shown in FIGS. 2 and 2a, a lower end 50 of the screw or auger member 48 extends to adjacent the lower end of the trough portion 40 at the bottom of the storage bin 24 and is fixed against axial movement relative to and for rotation with a rotatable anchor or shaft 51. An opposite end portion 52 of the auger member extends to a terminal end of the tube portion 46 and is connected by a suitable fastening device 54 to a shaft 56. The shaft 56 carries a pulley 58 which is driven by an endless belt 60 from a pulley 62 on an outlet shaft 64 of an electric motor and speed reducing unit 66.

It is to be noted that the drive shaft 56 is connected to the downstream end of the conveying screw member 48 so that as the screw member is rotated the load imposed by the feed or other material being conveyed places the screw member 48 under tension. This action tends to stretch and straighten the flexible and resilient helical screw member and as a result the screw member tends to center itself within at least the straight portion of the tube 34 for minimizing frictional contact between the screw member and the tube. In this connection, the diameter of the screw member 48 is made similar to but substantially less than the internal diameter of the tube as shown in FIGS. 2–4 so that when a screw member is centered within the tube frictional engagement between the parts is completely eliminated. This condition does not, of course, occur along all portions of the tube and screw member but the tendency of the screw member to center itself minimizes frictional contact and prevents grinding of the feed material against the wall of the tube. Furthermore, the feed in the inclined or bend portion of the tube aids in reducing frictional contact between the auger and the tube. In this connection it is to be noted that all inclined or bend portions are located upstream from all of the discharge openings in the tube 50 that there will always be some feed in the inclined or bend portions.

The upper end portion 52 of the screw member 48 is not only fixed for rotation with the shaft 56 but is also fixed against axial movement relative to the shaft 56. The lower end portion 50 of the screw member is also restrained against axial movement in a manner such that the screw member is slightly tensioned. This tension applied to the screw member and the additional tension from the load imposed thereon by the feed or other material being conveyed causes the screw member to center itself in the straight portions of the tube. While the portions of the flexible resilient screw member 48 which are bent to follow the curvature of the tube portions 42 and 44 bear against the tube walls at the inside of the curves. However, it is important to note that during operation of the apparatus the load imposed by the feed causes the screw member to stretch but since the end 50 is fixed against axial movement, the slight increase in length of the screw tends to accumulate in the bend portion of the tube with the result that the screw tends to center itself in the bend portions thus relieving the aforementioned contact with the inside curved walls of the tube. The pretensioning of the screw is sufficient for preventing the bend portions of the screw from being urged aggressively against the outer curved walls of the tube. In other words, the aforementioned tensioning of the screw member is such that the screw member tends to center itself within at least central portions of the bend sections of the tube during operation of the apparatus and areas of aggressive engagement between the tube and the screw member are avoided for minimizing wear of the parts and increasing efficiency.

The conveyor tube 34 is formed with discharge openings 68 in lower sides thereof communicating with downwardly extending tubes 70 in alignment with each of the hoppers 28. Each hopper has a cover 72 formed with an inlet opening 74 having a diameter greater than the external diameter of an associated tube 70. The discharge opening 74 is defined by an upwardly extending sleeve 76 which telescopes around the tube 70. Thus each hopper 28 is adapted to be vertically adjusted relative to its associated supply tube 70.

As will be understood, vertical adjustment of the hoppers 28 and their associated conveyors 30 and pan assemblies is desirable in order to position the feeding pan assemblies 32 at different heights for animals or birds of different sizes. Thus the hoppers and associated conveying mechanisms 30 are suspended from the ceiling or other suitable overhead structure of the building 22 by a plurality of cables 80 extending around pulleys 82 and connected with a mechanism 84 adapted to be operated for winding up or paying out the cables for raising and lowering the feeding mechanisms.

When the hoppers 28 are raised in the manner indicated above, the sleeve portions 76 thereof slide up along the tubes 70 depending from the tube portion 46 which is supported by suitable hangers 86 in fixed relationship to the building 22. Continued upward movement of the hoppers 28 causes the lower ends of the tubes 70 to pass through the openings 74 and in the event the hoppers are substantially full of feed 88 as indicated in FIGS. 2 and 2a the lower ends of the tube 70 will interfere with and engage the pile of feed. In order to prevent this interference from restraining further upward movement of the hoppers, the tubes 70 are of a flexible corrugated or other axially collapsible and extendable construction. The flexible tube also accommodates any misalignment between the hoppers and the discharge openings 68.

When the conveyor mechanism 26 is operated for delivering feed from the bin 24 to the hoppers 28, the feed will fall through successive apertures 68 and successively fill the hoppers. Since the hopper located at the extreme downstream end of the conveyor mechanism 26 is the last to be completely filled, a switch 90 is provided in this hopper responsive to the feed material when the hopper is substantially filled for opening an electric circuit and stopping the motor unit 66. Another switch 91 (see FIG. 8) is connected in the circuit for energizing the motor when the endmost hopper is nearly empty. This circuit can be of conventional construction and need not be shown herein. If desired, a single switch with appropriate mechanism can be used both to turn the motor on and off.

Referring now to FIGS. 1 and 7 through 12, the conveying means 30 associated with each of the hoppers 28, comprises an elongated tube 92 made up of one or more sections. As previously indicated, the tube is suspended above the floor of the building by a plurality of the cables 80. One end portion 94 of the tube extends to a trough-like fitting 96 secured to the lower end of its associated hopper 28 and an opposite end portion 98 of the tube carries a housing 100 on which a motor and speed-reducing unit 102 is mounted for presenting a drive shaft 104 in axial alignment with the tube.

Each conveyor mechanism 30 further includes an elongated one-piece resilient helical wire screw or auger 106 essentially identical to the auger 48 described above. The downstream end of the auger 106 is fixed by a fastening device 108 to the drive shaft 104 for rotation with and against axial movement relative to the drive shaft. With this arrangement the load imposed on the auger 106 during a feed conveying operation places the auger under tension for tending to center the auger within the tube. The auger 106 has a maximum diameter less than the internal diameter of the tube 92 so that this centering action minimizes frictional engagement between the auger and the tube. In this conveyor unit which is straight throughout its length, the centering action of the auger is further promoted by pre-stressing and tensioning the auger. Preferably this auger is pre-tensioned with a greater force than the auger in the curved tube for preventing or minimizing elongation of the auger during operation of the apparatus. More specifically, an upstream end portion 110 of the auger extends around a shaft 112 which is rotatably supported and fixed against axial movement by bearing means 114 as shown in FIG. 8. The end portion 110 of the auger is secured to the shaft 112 by suitable fastening means such as by welding or by utilizing an expandable construction for the shaft 112. The arrangement is such that in order to assemble the end portion 110 with the shaft 112 it is necessary for a workman to stretch the auger 106 which in a normal or unstretched condition is shorter than the tube 92 or the distance between the shafts 104 and 112. In other words, it is necessary for the workman to pre-stretch the auger and this pre-stretched condition is maintained by the anchor provided by the shaft 112.

As shown best in FIG. 1, each of the conveying means 30 has a plurality of feeding stations or feeding basket assemblies 32 spaced along the tube 92. At each of the feeding stations except at extreme downstream ends of the conveyor mechanism each tube 92 is provided with an aperture 118 in its lowermost side as shown best in FIGS. 6, 11 and 12. It is to be noted that the length of each aperture 118 is substantially the same as and preferably not greater than the pitch of the helix of the screw conveyor member or auger 106 and the width of each aperture 118 is between about 30% to 50% of the outside diameter of the tube and is preferably about one-third the tube diameter and less than about one-half the length of the aperture. This arrangement assures the free passage of feed material through the aperture 118 and into an associated feed pan assembly but at the same time promotes the passage of at least some feed material past the aperture as will be described more in detail below.

Each of the pan assemblies 32 with the exception of the one at the extreme downstream end of the conveyor tube 92 comprises a hanger member 120 shown best in FIGS. 5, 6, 9 and 10. The hanger 120 is preferably formed from sheet metal and is provided with an aperture 122 therethrough adapted slidably to accommodate the conveyor tube 92. When assembling the hanger member 120 with the tube 92, the hanger member is slipped over an end of the tube and then moved along the length of the tube to the desired location.

The hanger member 120 is hollow as shown in FIG. 6 and is provided with opposite end walls 124 and 126 spaced apart a distance slightly greater than the length of a discharge aperture 118 with which the hanger member is to be associated. In order to retain the hanger member and thus the associated pan assembly at the desired location on the tube 92, lugs 128 and 130 are formed integrally with the tube 92 at opposite ends of the aperture 118 for extending within the end walls 124 and 126 of the hanger member as shown in FIG. 6. The lugs 128 and 130 extend downwardly from the lower side of the tube 92 and in order to permit the hanger member 120 to be assembled with the lugs, notches 132 and 134 are formed in the end walls 124 and 126 at the upper side of the tube accommodating opening 122. Thus during assembly of the hanger member with the tube 92, the hanger member is rotated relative to the tube to an upsidedown position or, in other words, to a position in which the lugs 128 and 130 are aligned with the notches 132 and 134. Then the hanger member is slipped along the tube until the lugs enter within the sidewalls 124 and 126 whereupon the hanger member is rotated relatively to the tube to the position shown in FIG. 6. Assembly of the hanger member with the tube may thus be accomplished without the aid of screws, bolts or other separate fastening devices. Note that when the hanger 120 is in position on the tube 92 and the pan assembly is complete the hanger and pan assembly are fixed relative to each other and fixed axially to the tube but are free to rotate radially about the longitudinal axis of the tube.

A flange 136 is secured to and extends radially outwardly from a lower end of the hanger member 120 and a plurality of wire elements 138 are welded or otherwise secured to the flange 136 and extend radially outwardly and downwardly therefrom and terminate in substantially vertical portions 140 having bottom ends welded or otherwise fixed to vertically spaced circular wires 142 and 143. The basket-like structure provided by the wires 140, 142 and 143 is adapted to support a pan 144 having a radially extending ledge 146 in a sidewall thereof beneath which ledge the wire 142 is adapted to be engaged while the wire 143 engages the upper edges of the pan.

In order to facilitate assembly of the basket-like structure provided by the wires 140, 142 and 143 with the pan 144, the circular wires 142 and 143 are interrupted at 148 as shown in FIG. 5. This enables an operator to spring the wires outwardly sufficiently to permit the wire 142 to be snapped beneath the ledge 146. In order to lock the wire structure with respect to the pan 144, a tying wire 150 has ends hooked around a pair of adjacent wires 138, which last mentioned wires extend at opposite sides of the interruption 148 in the wire 142. It will be observed that as the adjacent wires 138 extend upwardly they gradually approach each other so that when the tie wire 150 is slipped upwardly the lower ends of the adjacent wires 138 along with the interrupted circular wire 142 may be sprung outwardly as discussed above for assembly with or removal from the pan 144. On the other hand, when the tie wire 150 is slipped downwardly to the position shown in FIG. 5, the wire structure is locked on the pan.

A small spring latch 152 is pivotally mounted on the tie wire 150 and is adapted to be hooked beneath an inturned upper marginal bead 153 of the pan 144 for retaining the tie wire 150 in its locking position.

Each pan assembly 32 is provided with a tubular cylindrical member 154 fixed with respect to and depending from the hanger member 120 as shown best in FIGS. 5 and 6. The tubular member 154 is in alignment with the discharge opening 118 in the bottom of the conveyor tube and serves as a portion of means for receiving and retaining a supply of feed in a manner such that the feed is dispensed gradually over the bottom of the pan in accordance with the needs of the animals being fed. This means further includes a slightly conical sleeve or straight member 156 having an upper end surrounding a lower end portion of the tube or cylindrical member 154 and a lower end adjacent the bottom of the pan 144. Hooks 158 and 160 function to hang the conical member 156 from the cylindrical member 154 and it is to be noted that the cylindrical member is provided with series of apertures 162 and 164 into which the hooks may be selectively positioned for adjusting the height of the lower end of the conical member with respect to the bottom of the pan. As will be understood the spacing of the lower edge of the conical member from the bottom of the pan regulates the rate at which feed may flow from the storage chamber defined by the conical member 156 and the cylindrical member 154. It is to be noted that the spacing of the conical member from the pan will not be changed in the event an operator lowers the conveying system sufficiently so that the pans rest directly on the floor since the pans are held in substantially fixed relationship by the wire basket structures.

The diameter of the cylindrical member 154 and the maximum diameter of the conical member 156 are relatively small as compared with the diameter of the pan 144 so that there is a large area of the pan open to permit the poultry or other animals being fed to obtain the feed freely. However, in order to prevent the birds from merely scratching the feed out from the central storage chamber in a manner which might cause the feed to be wasted, a circular baffle 157 is disposed in the pan between the sidewall of the pan and the lower end of the conical member 156. The baffle member is removably positioned in the pan and is centrally located by straps 159 and 161 having intermediate portions welded or otherwise secured to the circular baffle member and opposite ends removably engageable with the sidewalls of the pan.

The feeding pan assembly 32a at the extreme end of the conveyor tube shown in FIG. 7 is similar to the remaining feeding pan assemblies. However, the housing 100 takes the place of the hanger member 120. The housing 100 not only provides means for supporting the motor unit 102 but also includes a socket portion 162 for receiving the end of the tube 92. The tube 92 terminates well short of a back wall of the housing 100 so as to assure that all feed reaching the end of the tube will fall directly into the storage chamber provided by the member 154a and sleeve 156a and will not interfere with the motor unit. A switch 164 is mounted in association with the housing 100 which switch is actuated by a depending paddle 165 responsive to a pile of feed accumulating within the adjacent member 154a for stopping the motor unit 102 when the cylindrical member is full. The paddle is pivoted above the tube for obtaining maximum leverage and the paddle is centered with respect to the tube and has an oversized opening therein through which the tube freely extends so as not to interfere with pivotal movement of the paddle. The member 154a has a rectangular cross-section for enabling the feed to spread evenly across the face of the paddle for promoting proper operation of the paddle. The electrical circuit means for connecting the switch 164 with the motor unit may be of known construction and need not be described in detail.

When the motor unit 102 is energized for driving the auger 106 and initially delivering feed from an associated hopper 128 to the pan assemblies 32, feed is first advanced along the tube 92 to the discharge opening 118 at the first pan assembly. A major portion of the feed immediately falls through this discharge opening and begins filling the storage chamber defined by the cylindrical member 154 and the conical member 156 of the first pan assembly. However, as indicated above the size of the discharge opening 118 is related to the structure of the tube and the auger so that relatively small portions of the feed bypass the hole and are advanced toward successive pan assemblies. The first pan assembly will be filled much more rapidly than any succeeding pan assemblies and when it becomes full, all of the feed material will be advanced toward successive pan assemblies. In this manner, each successive pan assembly is filled until the final assembly shown in FIG. 7 is filled and the switch 164 is actuated to deenergize the motor 102.

When the birds or other animals have eaten the food in the pan assemblies and particularly in the endmost assembly shown in FIG. 7 the switch means 164 which includes an element for detecting when the pan assembly is substantially empty as well as when the pan assembly is substantially full, functions to energize the motor unit 102. In this connection it has been found that the feed is used by the birds in all of the pan assemblies sufficiently uniformly so that only switch means in the last pan assembly is required.

As indicated above, during the first filling of the pan assemblies food is primarily delivered to the pan assemblies in sequence, but portions of the feed will bypass the upstream opening so that feed is delivered to at least several of the pans simultaneously. It is important to note that during a second filling of the pan assemblies food is delivered to all of the pan assemblies substantially simultaneously. More specifically, during the first filling of the pan assemblies the food not only fills the pan assemblies but also fills the tube 92 throughout the length thereof. The pan assemblies are spaced from each other along the tube 92 so that the volume or capacity of successive tube sections between successive pan assemblies is similar to the volume of the storage chamber of the pan assemblies provided by the members 154 and 156. Thus, during the second filling of the pan assemblies, the food is delivered to the pan assemblies directly from the sections of the tube 92 between the pan assemblies and, as indicated, the volumes of food in these sections of the tube 92 are sufficient to fill the pan assemblies so that the switch 164 will be actuated for stopping the motor 102. This operation causes the tube 92 to be substantially emptied of feed so that the next filling of the pan assemblies requires feed to be delivered from the hopper 28 successively to the pan assemblies in the same manner as the initial filling operation. In other words, as the filling operations are repeated over and over again, the pan assemblies will alternatively be successively filled and simultaneously filled. As a result the birds will not be subjected to a pattern of operation in which only certain pans are always filled first which would result in the birds tending to congregate and crowd around only such pans. More specifically, the operation is such that the birds will tend to gather generally uniformly around all of the pans.

An electric wire 166 is stretched over each of the tubes 92 of each conveyor unit 30 from the associated hopper 28 to a bracket 168 adjacent the associated housing 100. The wire is connected to the bracket 168 by a tension spring 170 for insuring proper tension in the wire at all times. Insulators 172 are mounted on top of the hanger members 120 of each pan assembly for supporting intermediate portions of the wire. As shown best in FIGS. 5 and 10, each insulator has a slot 174 for receiving the wire. The wire and spring 170 exert a resilient force on the insulator members 172 which tends to hold the hanger members 120 against pivoting relative to the tube 92. Thus, if a bird should perch on the edge of a pan 144 so as to unbalance the pan assembly, the wire and spring tend to prevent the pan assembly from tilting unduly in a manner which will prevent the feed from being properly dispensed. When the unbalancing force is removed gravity and the spring tension return the pan assembly to a normal position.

While the preferred embodiment of the present invention has been shown and described herein, it is obvious that many structural details may be changed without departing from the spirit and scope of the appended claims.

The invention is claimed as follows:

1. A feeder system comprising a storage bin for food material and the like disposed at a first location, a hopper disposed at a second location spaced from said bin, tube means communicating with and extending from a lower end of said bin and extending upwardly with respect thereto, said tube means including an intermediate curved section and a section providing a discharge opening communicating with an upper end of said hopper, an elongated flexible resilient and expandible open cored auger rotatably disposed in said tube means and extending from said bin substantially to said opening for directing food material from said bin through said opening and into said hopper, means connected with a downstream end of said auger for rotating said auger, means connected with an upstream end of said auger for maintaining said auger under tension, second tube means having a first end communicating with the lower end of said hopper, said second tube means extending from said hopper to a plurality of feeding stations, said second tube means having discharge openings therein at each of said feeding stations, a second resiliently flexible and expendable auger rotatably disposed in said second tube means and extending from said hopper to a downstream end of said second tube means, means connected with the downstream end of said second auger for rotating said second auger, means anchoring an upstream end of said auger against axial displacement and maintaining said second auger in a tensioned condition, dispensing assemblies supported from said second tube means at each of said feeding stations and respectively communicating with said last mentioned discharge openings, each of said dispensing assemblies including a hanger member selectively positioned on said second tube means, means defining a storage chamber adjustably supported from and relative to said hanger member and a pan rigidly supported from said hanger member by spaced elements providing feed access openings and located beneath said chamber, and said second tube means having sections between said dispensing assemblies respectively having capacities similar to the capacities of said storage chambers of said dispensing assemblies.

2. In an apparatus of the type described tube means extending from a source of supply of material to be dispensed, said tube means having discharge openings therein at predetermined spaced intervals, means supporting said tube means for vertical adjustment, an elongated resiliently flexible hollow core auger rotatably disposed in said tube means for conveying material from said source of supply to said discharge openings, said auger having a predetermined pitch and said openings having a length similar to said pitch for promoting passage of a portion of the material past successive discharge openings, means connected with said auger for driving said auger, material dispensing pan assemblies mounted on said tube means in association with each of said discharge openings, said assemblies respectively comprising hanger means selectively positioned on said tube means, a pan rigidly supported from and beneath said hanger means by spaced elements providing feed access openings, and chamber means vertically adjustably supported from said hanger means above the bottom of said pan and in alignment with a discharge opening for receiving and storing a quantity of said material, said chamber means comprising a hollow member vertically adjustable relative to and independently of said pan for controlling the flow of material from said chamber into the pan.

3. An apparatus, as defined in claim 2, wherein said means for driving said auger is connected with a downstream end of the auger, and said apparatus includes means connected with an upstream end of said auger for maintaining said auger under tension and promoting centering of the auger within said tube means.

4. An apparatus, as defined in claim 2, wherein said tube means has predetermined outside and internal diameters, said auger having a diameter similar to but substantially less than the internal diameter of said tube means, and said discharge openings having a width between about thirty percent and fifty percent as great as said outside diameter of said tube means.

5. In an apparatus of the type described, elongated tube means extending from a source of supply of material to be dispensed to a plurality of spaced apart dispensing locations, said tube means having dispensing openings at each of said spaced apart locations, said tube means having elongated sections of predetermined capacity between said openings, means disposed within said tube means for conveying material from said source of supply to said dispensing openings, and dispensing assemblies associated with said tube means at each of said dispensing openings and including hanger means selectively positioned and swingable on said tube means and restrained against movement axially of the tube means, a pan supported rigidly from said hanger means, and tubular means supported beneath said hanger means and having a lower end adjacent to and slightly spaced above said pan and defining a material receiving and storing chamber having a capacity substantially the same as said predetermined capacity.

6. An apparatus, as defined in claim 5, wherein said conveying means includes an auger comprising an elongated resilient open cored helical member, said apparatus including means connected with a downstream end of said helical member for driving the helical member, and means connected with an upstream end of said helical member for maintaining said helical member under tension and promoting centering of the helical member within said tube means.

7. An apparatus, as defined in claim 5, wherein each of said dispensing assemblies comprises a pan supported from said tube means and having a bottom extending below said chamber providing means, said chamber providing means including a hollow member vertically adjustably supported independently of said pan for movement relative to said pan bottom and relative to said tube means.

8. In an apparatus of the type described, tube means extending from a source of material to be dispensed to a discharge location and having a discharge opening at said location, means connected to and vertically adjustably supporting said tube means, means for advancing said material through said tube means and said discharge opening, a dispensing assembly connected with said tube means in association with said opening, said assembly including means defining a material receiving and retaining chamber, hanger means selectively positioned on said tube means, a dispensing pan rigidly supported by spaced elements providing feed access openings from said hanger means independently of said chamber providing means and having a bottom extending beneath said chamber providing means, said chamber providing means including a hollow member adjustably supported for vertical adjustment relative to both said hanger means and said pan bottom.

9. An apparatus, as defined in claim 8, wherein said hollow member of said chamber means has a maximum predetermined diameter and said pan has a diameter at least substantially three times as great as said predetermined diameter.

10. In an apparatus of the type described, tube means extending from a source of material to be dispensed to a dispensing location and having a discharge opening in a lower side thereof at said dispensing location, a dispensing assembly connected with said tube means at said dispensing location, said assembly comprising a hanger member encircling said tube means, said hanger member having an aperture therethrough axially slidably and rotatably receiving said tube means, said hanger member having an open bottom aligned with said dispensing opening, pan means supported from said hanger member, lug elements extending from said tube means adjacent said dispensing opening and engageable with inner surfaces of said hanger member for retaining the hanger member against axial displacement along said tube means, and said hanger element having notches therein at an upper side thereof for enabling said lug elements to pass into the hanger member when the hanger member is rotated relative to the tube means.

11. An apparatus, as defined in claim 10, which includes an electrical wire extending above said tube means, means for resiliently maintaining said wire under tension, an insulator member on said hanger member and receiving said electrical wire, said wire serving to restrain said hanger member against rotation relative to the tube.

12. In an apparatus of the type described, elongated conduit means extending from a source of material to be dispensed to a discharge location and having a discharge opening at such location, means for advancing said material through said conduit means to said discharge opening, means supporting said conduit means and said advancing means for vertical adjustment, a dispensing assembly connected with said conduit means in association with said opening, said assembly including hanger means selectively positioned on said conduit means, means defining a material receiving and retaining chamber suspended from said hanger means, a dispensing pan rigidly supported from said hanger means independently of said chamber providing means by spaced elements providing feed access openings and having a bottom extending beneath said chamber providing means, said pan being capable of supporting said conduit means when said supporting means has been manipulated for lowering said conduit means sufficiently to enable the pan to engage a floor, and means vertically adjustably supporting said chamber providing means from said conduit means for vertical adjustment relative to both said conduit means and said pan bottom.

13. In an apparatus of the type described, tube means for extending from a source of material to be dispensed and having a discharge opening in a lower side thereof at a predetermined dispensing location, a dispensing assembly connected with said tube means at said dispensing location, said dispensing assembly comprising a hanger member substantially encircling and rotatably disposed on said tube means, pan means substantially rigidly supported from said hanger member and rotatable relative to the tube means in unison with said hanger member, and means extending between said tube means and said hanger member for limiting axial movement of the hanger member relative to the tube means and for permitting rotation of the hanger member relative to the tube means.

References Cited by the Examiner

UNITED STATES PATENTS

| | | | |
|---|---|---|---|
| 2,646,023 | 7/1953 | Virgil | 119—51 |
| 2,652,954 | 9/1953 | Nowak | 198—64 X |
| 2,681,639 | 7/1954 | Littlefield | 119—52 |
| 3,033,163 | 5/1962 | Hostetler et al. | 119—52 |
| 3,085,552 | 4/1963 | Pilch | 119—52 X |

SAMUEL KOREN, *Primary Examiner.*

HUGH R. CHAMBLEE, *Examiner.*